United States Patent [19]

Kamat

[11] 4,415,622

[45] Nov. 15, 1983

[54] FUSIBLE INTERLINING OF IMPROVED BOND STRENGTH AND DRY CLEANING RESISTANCE

[75] Inventor: Dattatraya V. Kamat, Jenkintown, Pa.

[73] Assignee: Kayser-Roth Corporation, New York, N.Y.

[21] Appl. No.: 438,595

[22] Filed: Nov. 2, 1982

[51] Int. Cl.³ ............................................. B32B 27/14
[52] U.S. Cl. .................................... 428/198; 2/243 R; 156/283; 156/334; 428/196; 428/197; 428/201; 428/246; 428/253; 428/284; 428/402
[58] Field of Search ............... 2/243 R, 232; 526/352, 526/352.2; 428/195, 196, 197, 198, 201, 246, 253, 284, 402; 156/283, 334

[56] References Cited

U.S. PATENT DOCUMENTS 4,333,980  6/1982  Russell ................................ 428/195

FOREIGN PATENT DOCUMENTS 944245  12/1963  United Kingdom ................ 428/198

*Primary Examiner*—James J. Bell
*Attorney, Agent, or Firm*—Bell, Seltzer, Park & Gibson

[57] ABSTRACT

A fusible interlining having enhanced bond strength with resistance to dry cleaning and comprising a support web and a heat activatable adhesive carried by said support web, said adhesive comprising polyethylene having a melt index of at least 60, a density of at least 0.91 and a relatively narrow molecular weight distribution, as expressed by having a MW:MN ratio of no more than 4.

12 Claims, No Drawings

FUSIBLE INTERLINING OF IMPROVED BOND STRENGTH AND DRY CLEANING RESISTANCE

FIELD AND BACKGROUND OF THE INVENTION

This invention relates to a fabric laminate, and more particularly to a fusible interlining material suitable for use in garment construction.

Fusible interlining materials are conventionally used in the manufacture of wearing apparel, such as suits, blouses and ties, to provide the desired body, drape and appearance characteristics to the article of apparel. The fusible interlining material includes a support web, suitably of nonwoven, woven or knitted construction, and a heat activatable adhesive provided on at least one surface of the support web. During the manufacture of the garment, the interlining material is bonded to another fabric, typically the inner surface of an outer fabric of the garment or other fabrics used in garment construction, by subjecting the fabric and interlining material to heat and pressure sufficient to activate the adhesive and to cause it to flow and bond the interlining material to the fabric.

In order to perform satisfactorily as a fusible interlining, the interlining material must form a strong bond with the garment fabric without undesirable strike-through or strike-back. The interlining must also be able to withstand the normal cleaning cycles to which the garment will be subjected, such as washing, dry cleaning, tumble drying and ironing for example. Additionally, it must avoid wrinkling or puckering both during the cleaning cycles and throughout the life of the garment. Generally, in order to satisfy all of these criteria, the interlining materials have been tailored for specific end use applications. Thus, for example, certain interlining materials are designed specifically for use in wash and wear garments, or lightweight or delicate garments, such as blouses, while other interlining materials are designed specifically for use in the collars of men's shirts, where both laundering and steam ironing may be encountered, and still other specific interlining materials are designed for use in men's suits or ties, for example, which would ordinarily be subjected to dry cleaning.

The fusible interlinings designed for use in washable fabrics typically use an adhesive formed from low density polyethylene. A number of such adhesives are available at a relatively low cost and perform suitably under normal conditions of washing and drying. However, these adhesives are not recommended for use in lightweight or delicate fabrics or in interlining materials which will be subjected to dry cleaning, since lightweight or delicate fabrics normally cannot withstand the high temperatures and pressures needed to bond such low density polyethylene materials, and the bond strength of the adhesive is destroyed by dry cleaning solvents. In order to provide the required strength and permanence of bond in lightweight or delicate fabrics and in those fabrics which will be subjected to dry cleaning, it has been necessary in the fusible interlining materials heretofore available to employ specially formulated adhesives, typically based on co- or ter-polyamides or co- or ter-polyesters. These specially formulated adhesive materials are quite expensive compared to the above-noted conventionally used low density polyethylene adhesives, and thus the cost of producing interlining materials using these adhesives is significantly increased. Hence, the use of these adhesives has been restricted to applications where the special properties of the adhesive is important. While medium and high density polyethylene adhesives have been available which offer increased dry cleaning resistance as compared to the more commonly used low density polyethylene adhesives employed in washable applications, these adhesives are useful only in certain restricted applications, such as in the fusing of shirt collars for example, since their flow characteristics require relatively high temperatures and pressures to effect bonding. Such conditions cannot be used in fabrics of general applicability since these high temperature and pressure conditions would undesirably affect the fabric aesthetics.

It is therefore an object of the present invention to provide a more economical alternative to the relatively expensive specialized adhesives which must be used in producing a fusilbe interlining useful for lightweight or delicate fabrics or for dry cleaning applications.

More specifically, it is an object of this invention to provide a fusible interlining material with an improved adhesive suitable for use both in applications involving laundering as well as applications involving dry cleaning.

SUMMARY OF THE INVENTION

I have now found that a specific class of polyethylene polymer, when used as an adhesive in a fusible interlining material, provides excellent dry cleaning resistance, even when compared to the more expensive polyamide and polyester co- and ter-polymers heretofore used for this purpose, and further, that this class of polymer provides bonding characteristics significantly better than the polyethylene adhesives heretofore used.

The polyethylene polymer materials which have been found suitable for use in the present invention are characterized by having a melt index of at least about 60, a density of at least about 0.91 and a relatively narrow molecular weight distribution, as expressed by having an MW:MN ratio of no more than about 4.

Thus, the present invention is directed to a fusible interlining having enhanced bond strength and resistance to dry cleaning, comprising a support web and a heat activatable adhesive carried by the support web, said adhesive comprising polyethylene having a melt index of at least about 60, a density of at least about 0.91 and a relatively narrow molecular weight distribution, as expressed by having an MW:MN ratio of no more than about 4.

The present invention is also directed to a fabric laminate having enhanced bond strength and resistance to dry cleaning, comprising first and second fabric layers and a heat activatable adhesive bonding the fabric layers together, and wherein the adhesive is a polyethylene of the type described above.

The resultant bonded fabric assemblies using this particular class of adhesive are characterized by having excellent adhesive flow properties at temperatures and pressures which will not damage lightweight or delicate fabrics and without exhibiting undesirable strike-through or strike-back, having high bond strength, and exhibiting excellent resistance to laundering and dry cleaning.

DETAILED DESCRIPTION OF PREFERRED EMBODIMENT

The polyethylene polymers which are useful as adhesives in the present invention are characterized by having a density of from about 0.91 and above and having a relatively high melt index of at least about 60, and preferably at least about 70. This relatively high melt index is important in obtaining the desired flow of the adhesive for effecting bonding, without the necessity of using excessive pressures and/or temperatures which could adversely effect the aesthetic characteristics of the fabric.

A further and very significant characteristic of the polyethylene polymers of this invention which clearly distinguishes these polymers over other polyethylene adhesives heretofore used for bonding textile fabrics is that the polymer be of a relatively linear structure with minimum branching and with a quite narrow molecular weight distribution. This particular characteristic may be expressed quantitatively by the ratio of the weight average molecular weight (MW) to the number average molecular weight (MN). This MW:MN ratio is also sometimes referred to as the "polydispersity" factor. Polyethylene polymers suitable for use as adhesives in accordance with the present invention are characterized by having a polydispersity or MW:MN ratio of no more than about 4, and most desirably no more than about 3.

The desired characteristics of linear structure with minimum branching and relatively narrow molecular weight distribution can be obtained by the polymerization of ethylene in a tubular reactor rather than in an autoclave as is conventionally done in the production of most of the polyethylene currently available. Generally, the inner diameters of the tubular segments in the tubular reactor range between about 0.5 to about 3 inches and the reactor length between about 800 and about 3,000 feet or more. The reactor can be operated at pressures from about 15,000 to about 100,000 psi, preferably between about 30,000 and about 50,000 psi. The reaction temperatures generally range from about 250° F. to about 650° F. or higher.

The initiator for the polymerization reaction includes oxygen and the peroxides such as hydrogen peroxide, 2,4-dichlorobenzoyl peroxide, caproyl peroxide, lauroyl peroxide, t-butyl peroxyisobutyrate, benzoyl peroxide, p-chlorobenzoyl peroxide, diisopropyl peroxidicarbonate, acetyl peroxide, decanoyl peroxide, t-butyl peroxypivalate, t-butyl peroxyacetate, t-butyl peroxybenzoate, cumyl peroxide, deithyl dioxide, t-butyl hydroperoxide, methyl ethyl ketone peroxide, di-t-butyl diperoxyphthalate, hydroxyheptyl peroxide, cyclohexanone peroxide, p-menthane hydroperoxide, pinane hydroperoxide, cumene hydroperoxide, t-butyl peroxide, 2,5-dimethyl hexane-2,5 dihydroperoxide, t-butyl peroctoate, t-butyl peracetate, 1,1,3,3-tetramethyl butyl hydroperoxide, or mixtures thereof.

A chain transfer agent can also be introduced into the polymerization system with the feed in amounts ranging from 0.01 to 5 mole percent of the ethylene feed. The chain transfer agent includes, for example, hexane or butane or a comonomer such as propylene which also functions as a chain transfer agent.

Desirably, the polyethylene polymer should be substantially free of additives such as slip additives, antiblock agents, or bonding agents such as vinyl acetate.

Particularly suitable for use in this invention are polyethylene polymers having a melt index of at least about 70, a density of from about 0.91 to about 0.93 and a molecular weight within the range of about 30,000 to about 60,000.

One commercially available polyethylene polymer having the characteristics described above is sold under the designation Rexene®PE-127-CS219 by El Paso Polyolefins Company of Paramus, N.J. This polymer is characterized by having very high flow and rapid set-up characteristics, excellent clarity, gloss and stiffness. It was developed and recommended for use in injection molding, particularly in applications where the mold is difficult to fill, such as in the production of injection molded lids.

The physical properties of this polyethylene polymer are set forth in Table 1 below. For purposes of comparison, also set forth in this table are the properties of a commercially available low density polyethylene powder which is currently being marketed for use as an adhesive in fusible interlining materials, but which does not exhibit the enhanced dry cleaning resistance found in this polymer.

TABLE 1

| Property | Dry Clean Resistant Polyethylene Adhesive of this Invention | Commercially Available Non-Dry Clean Resistant Polyethylene Adhesive |
|---|---|---|
| Melt index | 80 | 62.5 |
| Density | 0.924 | 0.9132 |
| Percent Vinyl Acetate | None | 1% |
| Weight Average MW (MW) | 39,950 | 87,599 |
| Number Average MW (MN) | 13,322 | 15,160 |
| MW:MN | 2.99879 | 5.7783 |
| Z-Average MW (MZ) | 87,742 | $2.8 \times 10^5$ |

It will be seen from the above table that the polyethylene adhesive of the present invention has a significantly higher melt index and a greater density than the comparison adhesive of the prior art. This adhesive also has a much narrower molecular weight distribution, as evidenced by the lower MW:MN ratio. The significantly lower Z-average molecular weight (MZ) shows that the adhesive has very little polymer of unduly high molecular weight. The combination of these properties are believed to contribute to the proper flow characteristics at relatively low temperature and pressure, and to provide a bond which is resistant to dry cleaning solvents and which thus makes this polyethylene polymer suited for use in lightweight or delicate fabrics and as a dry cleaning resistant adhesive for bonding of textile fabrics.

Typical fabrics suitable for use as a support web for the fusible interlinings of this invention include nonwoven fabrics, knitted fabrics such as weft inserted knits, and wovens. The polymer is suitably applied to the support web in the form of a powder and secured thereto by sintering. The polymer can be applied to the support web on one or both surfaces by various methods of application known in the art, such as by sprinkling, printing or extrusion. The adhesive may be applied in various patterns such as dots, lines, continuous film, or random sprinkling.

While the polyethylene adhesive composition has been described herein with particular reference to its use in a fusible interlining material, it will be recognized that this material is also useful as an adhesive for textile fabrics in other applications where it is desired to provide a laminate formed of two or more fabric layers with a bond exhibiting resistance to dry cleaning and excellent strength even when fused at low temperatures and pressures.

ILLUSTRATIVE EXAMPLES

The following examples are provided for purposes of providing a better understanding of this invention by illustrating suitable methods of making and using fusible interlining materials in accordance with this invention and by illustrating the improved performance of these materials over conventional prior art interlining materials. These examples are intended as being illustrative and not as limiting the scope of this invention. It should be recognized that from these examples and the other disclosure herein, persons skilled in the arts applicable to the present invention will be able to produce products and methods which embody the present invention and yet take forms which may differ from those here particularly described and shown.

EXAMPLE 1

This example describes the production of fusible interlining materials using the class of polyethylene adhesive of this invention (identified herein as 9550 XDK4 and 9550 XDK5) and compares the strength and wash and dry clean performance of these interlining materials with a standard fusible interlining material utilizing a polyethylene adhesive not recommended for dry cleaning applications (identified as 9550 SPE1). The respective adhesives were applied to a 0.8 ounce per square yard polyester fiber nonwoven base fabric at a rate of about 0.5 ounces per square yard and the polyethylene adhesive was sintered to the nonwoven substrate. Specimens were fused to base fabrics using a standard Reliant Rolamatic press at 285° F., 4 psi, 10 seconds; and on a Hoffman Utility press at settings of 5 steam/8 dwell/3 vacuum onto textured polyester and polyester/cotton shell cloths. Following fusing, all samples exhibited excellent bond strengths, surface appearances, and dimensional stability levels. After five wash cycles, all samples retained excellent bonds. Excessive levels of substrate shrinkage were noted in some cases, for both the control and the polymer of the invention, and localized bubbling on surfaces of two poly/cotton samples were observed. All textured polyester samples retained excellent surface appearances after washing. Dry cleaning performance was also examined after three dry cleaning cylces. Delamination occurred with all 9550 SPE1 samples. All squares with 9950 XDK4 and 9950 XDK5 fusibles retained excellent bonds, surface appearances, and dimensional stability levels after three dry cleanings. These results are described more fully in Table 2 below.

In addition to the above performance evaluations, fusibility of the sintered polyethylene adhesive coatings of the present invention have been examined after hand ironing. Samples were fused to textured polyester shell cloths by applying a hand iron over a pressing cloth. With the addition of steam, samples were pressed for 12 seconds in each area, with an overlapping movement over the square. Excellent bonds were achieved in all cases. Overall performance of the XDK4 and XDK5 sintered polyethylene coatings proved highly competitive with the control standard after fusing and washing. In addition, these new coatings offer highly encouraging dry cleaning performance.

TABLE 2

|  |  | Control Standard 9550 SPE1 | | The Invention 9550 XDK4 | | The Invention 9550 XDK5 | |
| --- | --- | --- | --- | --- | --- | --- | --- |
|  |  | Hoffman | Reliant | Hoffman | Reliant | Hoffman | Reliant |
| BOND STRENGTH | | | | | | | |
| Text. Poly. | Control | Excellent | Excellent | Excellent | Excellent | Excellent | Excellent |
|  | 3 × D/C | Delamination | Delamination | Excellent | Excellent | Excellent | Excellent |
|  | 5 × Wash | Excellent | Excellent | Excellent | Excellent | Excellent | Excellent |
| Poly/Cotton | Control | Excellent | Excellent | Excellent | Excellent | Excellent | Excellent |
|  | 3 × D/C | Delamination | Delamination | Excellent | Excellent | Excellent | Excellent |
|  | 5 × Wash | Excellent | Excellent | Excellent | Excellent | Excellent | Excellent |
| SURFACE APPEARANCE | | | | | | | |
| Text. Poly. | Control | Excellent | Excellent | Excellent | Excellent | Excellent | Excellent |
|  | 3 × D/C | Delamination | Delamination | Excellent | Excellent | Excellent | Excellent |
|  | 5 × Wash | Excellent | Excellent | Excellent | Excellent | Excellent | Excellent |
| Poly/Cotton | Control | Excellent | Excellent | Excellent | Excellent | Excellent | Excellent |
|  | 3 × D/C | Delamination | Delamination | Excellent | Excellent | Excellent | Excellent |
|  | 5 × Wash | Excellent | Localized Bubbling | Excellent | Excellent | Excellent | Localized Bubbling |
| DIMENSIONAL STABILITY | | | | | | | |
| Text. Poly. | Control | −0.3/−0.2 | −0.4/0 | −0.5/−0.3 | −0.2/−0.2 | −0.5/−0.3 | −0.2/−0.2 |
|  | 3 × D/C | Delamination | Delamination | −1.7/−1.5 | −0.8/−1.0 | −1.0/−1.1 | −0.9/−1.0 |
|  | 5 × Wash | −4.0/−1.5 | −4.1/−1.7 | −3.9/−2.2 | −3.9/−2.2 | −3.8/−2.1 | −4.0/−1.2 |
| Poly/Cotton | Control | −0.5/0 | −0.8/+0.2 | −0.5/−0.5 | −0.7/0 | −0.5/−0.5 | −0.5/0 |
|  | 3 × D/C | Delamination | Delamination | −1.2/−0.8 | −1.5/−0.3 | −1.5/−0.5 | −1.0/−0.3 |
|  | 5 × Wash | −4.1/−1.1 | −4.4/−1.0 | −4.1/−1.4 | −4.3/1.0 | −4.4/−1.5 | −4.0/−1.5 |

EXAMPLE 2

Samples of a fusible interlining material in accordance with the present invention (9507 XDK7) were evaluated as an alternative to a commercially available dry clean resistant interlining (9507 SE1) for blouse and men's wear small parts applications which uses a polyamide adhesive. Blouse fabrics used included 100% cotton knit, poly/cotton print and 100% polyester shells; men's wear fabrics were poly/wool, 100% wool and textured polyester. Squares were fused both on the Reliant Rolamatic press and on the Hoffman Utility press. Specimens exhibited excellent bond strengths, surface appearances and acceptable dimensional stability levels following fusing. Bond levels retained by XDK7 samples following five warm washings and three dry cleanings were excellent in all cases, with all other performance aspects competitive. This demonstrates that the fusible interlinings of the present invention compare quite favorably to the more expensive dry clean resistant interlinings heretofore produced which utilize more expensive polyamide adhesives. The results of these tests are described more fully in Tables 3 to 5 below.

TABLE 3

BOND STRENGTH

| | Comparison Standard 9507 SE1 | | The Invention 9507 XDX 7 | |
|---|---|---|---|---|
| | Reliant | Hoffman | Reliant | Hoffman |
| Cotton Knit | | | | |
| Control | Excellent | Excellent | Excellent | Excellent |
| 5 × Wash | Excellent | Excellent | Excellent | Excellent |
| 3 × D/C | Excellent | Excellent | Excellent | Excellent |
| Poly/Cotton Print | | | | |
| Control | Excellent | Excellent | Excellent | Excellent |
| 5 × Wash | Excellent | Excellent | Excellent | Excellent |
| 3 × D/C | Good | Excellent | Excellent | Excellent |
| 100% Polyester | | | | |
| Control | Excellent | Excellent | Excellent | Excellent |
| 5 × Wash | Excellent | Excellent | Excellent | Excellent |
| 3 × D/C | Excellent | Excellent | Excellent | Excellent |
| Poly/Wool | | | | |
| Control | Excellent | Excellent | Excellent | Excellent |
| 3 × D/C | Excellent | Excellent | Excellent | Excellent |
| 100% Wool | | | | |
| Control | Excellent | Excellent | Excellent | Excellent |
| 3 × D/C | Excellent | Excellent | Excellent | Excellent |
| Text. Poly. | | | | |
| Control | Excellent | Excellent | Excellent | Excellent |
| 3 × D/C | Excellent | Excellent | Excellent | Excellent |

TABLE 4

SURFACE APPEARANCE

| | Comparison Standard 9507 SE1 | | The Invention 9507 XDK 7 | |
|---|---|---|---|---|
| | Reliant | Hoffman | Reliant | Hoffman |
| Cotton Knit | | | | |
| Control | Excellent | Excellent | Excellent | Excellent |
| 5 × Wash | Excellent | Excellent | Excellent | Excellent |
| 3 × D/C | Excellent | Excellent | Excellent | Excellent |
| Poly/Cotton Print | | | | |
| Control | Excellent | Excellent | Excellent | Excellent |
| 5 × Wash | Bubbled | Excellent | Bubbled | Excellent |
| 3 × D/C | Bubbled | Excellent | Bubbled | Excellent |
| 100% Polyester | | | | |
| Control | Excellent | Excellent | Excellent | Excellent |
| 5 × Wash | Surface Eff. | Excellent | Surface Eff. | Excellent |
| 3 × D/C | Surface Eff. | Excellent | Surface Eff. | Excellent |
| *Poly/Wool | | | | |
| Control | Excellent | Excellent | Excellent | Excellent |
| 3 × D/C | Excellent | Excellent | Excellent | Excellent |
| *100% Wool | | | | |
| Control | Excellent | Excellent | Excellent | Excellent |
| 3 × D/C | Excellent | Excellent | Excellent | Excellent |
| *Text. Poly. | | | | |
| Control | Excellent | Excellent | Excellent | Excellent |
| 3 × D/C | Excellent | Excellent | Excellent | Excellent |

*All specimens retained excellent surface appearance following 30 sec. steaming.

TABLE 5

DIMENSIONAL STABILITY

| | 9507 SE1 Reliant | 9507 XDK 7 Hoffman |
|---|---|---|
| Cotton Knit | | |
| Control | −0.7/0 | −0.8/−0.4 |
| 5 × Wash | −3.0/−1.0 | −4.0/−1.0 |
| 3 × D/C | −1.5/0 | −2.0/−0.5 |
| Poly/Cotton Print | | |
| Control | −0.8/−0.4 | −1.0/−0.3 |
| 5 × Wash | −2.5/−2.5 | −2.9/−2.5 |
| 3 × D/C | −1.5/−1.3 | −1.6/−1.3 |
| 100% Polyester | | |
| Control | −0.8/−0.6 | −1.4/0 |
| 5 × Wash | −2.3/−1.3 | −3.0/−1.5 |
| 3 × D/C | −1.5/−1.0 | −1.6/−0.6 |

That which is claimed is:

1. A fusible interlining having enhanced bond strength with resistance to dry cleaning and comprising a support web and a heat activatable adhesive carried by said support web, said adhesive comprising polyethylene having a melt index of at least about 60, a density of at least about 0.91 and a relatively narrow molecular weight distribution, as expressed by having a MW:MN ratio of no more than about 4.

2. A fusible interlining according to claim 1 wherein said polyethylene has a weight average molecular weight of from about 30,000 to about 60,000.

3. A fusible interlining according to claim 1 wherein said polyethylene has a melt index of at least about 70.

4. A fusible interlining according to claim 1 wherein said polyethylene adhesive is in powder form and sintered to said support web.

5. A fusible interlining according to claim 1 wherein said polyethylene adhesive is substantially free from vinyl acetate additives.

6. A fusible interlining having enhanced bond strength with resistance to dry cleaning and comprising a support web and a heat activatable adhesive carried by said support web, said adhesive comprising a polyethylene polymer produced in a tubular reactor so as to have a narrow molecular weight distribution with minimal branching, said polymer having a melt index of at least about 60 and a density of at least about 0.91.

7. A fusible interlining according to claim 6 wherein said polyethylene polymer has a relatively narrow molecular weight distribution, as expressed by having a MW:MN ratio of no more than about 4.

8. A fusible interlining having enhanced bond strength with resistance to dry cleaning and comprising a support web formed of textile strand material and a heat activatable adhesive on at least one surface of said support web, said adhesive comprising a low density linear polyethylene polymer having a melt index of at least about 70, a density of about 0.91 to about 0.93, and a molecular weight within the range of about 30,000 to about 60,000.

9. A fusible interlining according to claim 8 wherein said polyethylene polymer has a relatively narrow molecular weight distribution, as expressed by having a MW:MN ratio of no more than about 4.

10. A fabric laminate having enhanced bond strength with resistance to dry cleaning and comprising first and second fabric layers and a heat activatable adhesive bonding said fabric layers together, said adhesive comprising polyethylene having a melt index of at least about 60, a density of at least about 0.91 and a relatively narrow molecular weight distribution, as expressed by having a MW:MN ratio of no more than about 4.

11. In a method of producing a fabric laminate comprising the steps of assembling first and second fabric layers with a heat activatable adhesive therebetween and subjecting the assembly to heat and pressure to activate the adhesive and to bond the fabric layers together, the improvement for obtaining enhanced bond strength with resistance to dry cleaning which comprises using as said heat activatable adhesive polyethylene having a melt index of at least about 60, a density of at least about 0.91 and a relatively narrow molecular weight distribution, as expressed by having a MW:MN ratio of no more than about 4.

12. In a method of producing a garment wherein a fusible interlining having a heat activatable adhesive thereon is positioned against the garment fabric and the assembly is subjected to heat and pressure to activate the adhesive and to bond the interlining to the garment fabric, the improvement for obtaining enhanced bond strength with resistance to dry cleaning which comprises using as said heat activatable adhesive polyethylene having a melt index of at least about 60, a density of at least about 0.91 and a relatively narrow molecular weight distribution, as expressed by having a MW:MN ratio of no more than about 4.

* * * * *